Feb. 6, 1962  E. A. ASH ETAL  3,020,498
COUPLED WAVEGUIDES
Filed Dec. 8, 1958  3 Sheets-Sheet 1

Inventors
E.A. ASH - J.D. PATTENDEN
By R.P. Morris
Attorney

Feb. 6, 1962  E. A. ASH ETAL  3,020,498
COUPLED WAVEGUIDES

Filed Dec. 8, 1958  3 Sheets-Sheet 2

Inventor
E.A. ASH - J.D. PATTENDEN
By *R P Morris*
Attorney

Feb. 6, 1962    E. A. ASH ETAL    3,020,498
COUPLED WAVEGUIDES

Filed Dec. 8, 1958    3 Sheets-Sheet 3

Inventor
E.A. ASH - J.D. PATTENDEN
By *R.H. Morris*
Attorney

United States Patent Office 3,020,498
Patented Feb. 6, 1962

3,020,498
COUPLED WAVEGUIDES
Eric Albert Ash and John David Pattenden, Aldwych, London, England, assignors to International Standard Electric Corporation, New York, N.Y.
Filed Dec. 8, 1958, Ser. No. 778,828
Claims priority, application Great Britain Dec. 30, 1957
9 Claims. (Cl. 333—33)

The present invention relates to waveguide directional couplers.

When two transmission lines of similar propagation constants are coupled together—for example, a pair of rectangular waveguides placed side by side with a coupling slot or coupling holes between them—an interchange of power occurs between them. Both forward and backward waves tend to be set up in the driven line, but by suitable proportioning of the coupling distribution, interference phenomena can substantially suppress the backward wave. With tight coupling between them and when this coupling persists over a sufficient length of the lines, power is transferred from the driving to the driven line and back again with spatial periodicity along the shared length. The principles involved are discussed in a paper by S. E. Miller, "Coupled Wave Theory and Waveguide Applications," published in the Bell System Technical Journal, Vol. 33, No. 3 (May 1954), page 661. Extensions of these principles are discussed in three papers, "Tapered Velocity Couplers" by J. S. Cook, "Wave Coupling by Warped Normal Modes" by A. G. Fox, and "Analysis of the Single Tapered Mode Coupler" by W. H. Louisell, published in Vol. 34, No. 4 (July 1955), of the same Journal at pages 807, 823, and 853 respectively.

S. E. Miller showed that, provided the propagation constants of the two lines were equal, both as regards attenuation constant and phase constant, a complete transfer of power from one line to the other was possible. One practical application of the principles elucidated by Miller is the contrawound helix coupler used for coupling the helix of a travelling wave tube to an external coaxial transmission line requiring no metallic connection to the tube helix and no connection through the vacuum seal: a short length of helix is wound about the travelling wave tube helix in oppositely directed pitch and the coaxial line feeder is connected only to this outer helix. A detailed discussion of this aspect of waveguide directional couplers is to be found in the paper "Coupled Helices," by J. S. Cook, R. Kompfner and C. F. Quate, published in The Bell System Technical Journal, Vol. 35, No. 1 (January 1956) at page 127.

The present invention can be said to constitute a further extension of the general field of investigation into coupled waveguide phenomena. Cook allowed the difference in phase velocity of a pair of coupled waveguides to vary slowly and monotonically; Fox simultaneously varied the coupling between the guides, causing the coupling coefficient to vary as the sine of an angle which is a function of axial distance along the guides and the phase velocity difference between the guides to vary as the cosine of that angle. Complete power interchange between the guides was completed at successive quarter periods of the spatial variation of phase velocity and coupling. In the paper by Cook, Kompfner and Quate it is stated, without reference to the extension to tapered couplers, that concentric helices of practically realizable dimensions and separations are very strongly coupled when, and these were important points, (a) They have very nearly equal velocities of propagation when uncoupled, and when
(b) They are wound in opposite senses.

According to the present invention we provide a pair of waveguides each constructed to provide substantially the same mean values of propagation constant for waves of the same frequency over a given length, the two waveguides being coupled together at least at many successive intervals each of said given length for substantially irreversible power interchange from one waveguide to the other over the complete length of all said intervals and in which the relative phase velocity for waves of said frequency varies in like manner in each said successive length. Thus in this arrangement there is a spatially periodic variation in relative phase velocity or coupling which is rapid compared to the variation in Fox's case and may be quite arbitrary, provided that, when averaged over each complete period of variation, the mean relative phase velocity remains the same for both lines. The coupling coefficient between the lines may also vary with the same spatial periodicity, but apart from this it may vary in arbitrary fashion—for example, the coupling may periodically be reduced to zero. The invention is applicable to the case of coupled helices and in this field, allows a considerable modification of the condition (a).

The concept of "relative phase velocity" in the present invention can fairly readily be appreciated in the case of two simple (e.g. rectangular) waveguides running straight and parallel to one another. In some other cases such as that of non-circular contrawound helices, the concept although clear enough qualitatively is less easily defined quantitatively. The basic principle underlying the invention can, perhaps, best be explained in the following way. If there are two coupled transmission lines of any kind, rectangular waveguides or helices, for example, and there is examined, at periodic intervals of length along a common axis the state of two waves of the same frequency, $f_1$, say, one propagating along one line and one along the other, then it is possible to show that wave power can be completely interchanged from one line to the other and back again, provided only that at these equally spaced apart points of observation the phase difference between the two waves appears to be the same. What has happened to the waves in between the points of observation does not matter, although, naturally, if the coupling between the lines vanishes in places in these unobserved lengths it would be found that the power transfer between the lines was less per average wire length than if the coupling had remained constant. It is to be noted also, that no change in phase difference between two successive observation points would be observed if one of the waves had been retarded with respect to the other by a complete number of periods of its frequency. This means, in the case of retardation of one of the waves, that similarly, in the case of two waves of a different frequency, $f_2$, they would not keep in step with one another between successive observation points, for the amount of retardation, a function of frequency, would be different; the conditions for complete power transfer from one line to the other would not be satisfied, at the frequency $f_2$. The invention can thus be used to provide a narrow band directional coupler to filter off power at a given frequency $f_1$ or a narrow band of frequencies around $f_1$ from a main transmission line carrying a wider band of frequencies. Embodiments of such narrow band couplers will be described below. A particularly important class of embodiments, of the invention, however, is in the field of relatively broad band contrawound helix couplers which may be used for coupling the helix of a travelling wave tube to an external feeder, normally a coaxial transmission line.

In the known forms of contrawound helix couplers as applied to travelling wave tubes, the travelling wave tube helix is supported in an accurately cylindrical tube of glass, quartz or ceramic and, as has been explained earlier on, a short length of coupling helix is wound closely about the main helix supporting tube, the pitch of the coupling helix being oppositely directed to that of the main helix. For efficient coupling the two helices must be close together. Since, normally, the coupling helix is required to be coupled, in its turn, to a coaxial transmission line feeder, provision has not only to be made for changing from the helix mode to the coaxial mode of wave propagation, but account has also to be taken of the difference in impedance between an unshielded helix, where the characteristic impedance may be some hundreds of ohms, and the normal coaxial line of some 50 to 70 ohms impedance. Furthermore, the unshielded helix is essentially a single conductor waveguide. All these points of difference between helix and coaxial line are conveniently taken care of if a closely spaced conducting surface is placed around the coupling helix. When this surrounding conductor is spaced from the helix by a distance less than that between adjacent turns of the helix, the dimensions involved fall into the range encountered in the use of microwave strip line, so that the coupling helix and its surrounding conductor can be considered as a helically coiled length of "microstrip" transmission line, as claimed in British Patent 704,050. The impedance of such a transmission line can readily be made to match that of a coaxial line, while it is a comparatively simple matter to arrange that the conductor of the coupling helix is continuous with the inner conductor of the coaxial line feeder, the conductor surrounding the coupling helix being made continuous with the outer conductor of the coaxial line. Because the field of such a transmission line transverse to the strip dies away rapidly with distance, it is evident that it is particularly important to ensure close spacing between the coupling helix and the travelling wave tube helix. Thus this arrangement has not, heretofore, been used where the travelling wave helix is supported, in order to keep the dielectric loading thereof low, in an insulating tube of triangular cross-section. Furthermore, it may well happen with a travelling wave tube employing a cylindrical envelope portion surrounding the helix, that larger diameter envelope portions are needed to accommodate not only the electron gun, at one end of the tube, but also the electron collector electrode at the other end. It is then not possible to slide a coupling helix and its associated components over an end of the travelling wave tube into position about the helix; the coupler must either be assembled permanently in position on the travelling wave tube or its use must be abandoned, and alternative coupling provisions be made in the internal construction of the travelling wave tube.

The present invention overcomes the above-mentioned difficulties by providing a contrawound helix coupler which can be efficiently used with a travelling wave tube having its helix supported in an insulating tube of polygonal cross-section. Again the invention provides a very convenient construction in which the coupling helix and its accessory components can be constructed as a unit for strapping to the travelling wave tube envelope without having to be passed over its ends. If desired these embodiments can be modified to apply to tapered couplers such as those disclosed by Cook in the paper referred to above.

The further description of the invention and embodiments thereof will refer to the accompanying drawings in which.

The contrawound helix coupler investigated by Cook, Kompfner and Quate is today finding general application as the means for coupling to the helix of travelling wave tubes and backward wave oscillators. With such a coupler it is not necessary to bring out a lead from the helix through the vacuum envelope of the electron discharge tube, a very large bandwidth of several octaves can be achieved, and the coupler is inherently directional, so that the termination of the helix beyond the coupler becomes unimportant. As has already been explained, however, it is necessary for the coupling helix to be closely spaced about the main helix. From the practical point of view of placing the coupling element about the helix ends, this means that at least one end of the tube, normally the electron collector electrode, must be no larger in diameter than the envelope portion surrounding the helix. At frequencies above about 5 kmc./s. this requirement becomes increasingly serious, for the helix diameter becomes smaller, while the collector size tends to remain constant.

Figure 1:
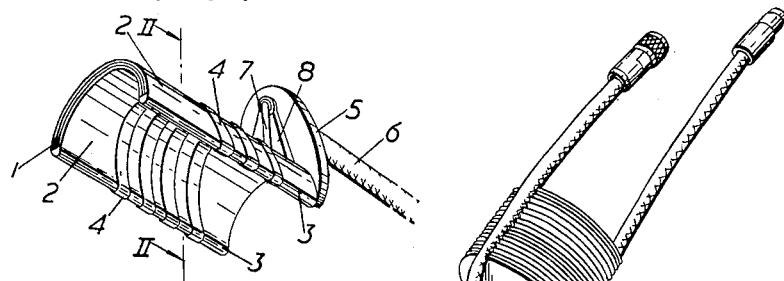
FIG. 1 shows diagrammatically a semicircular contrawound helix coupler element according to the invention.
Figure 3:
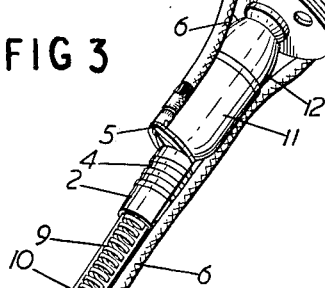
FIG. 3 shows a travelling wave tube and input and output couplers according to the invention.
Figure 2:
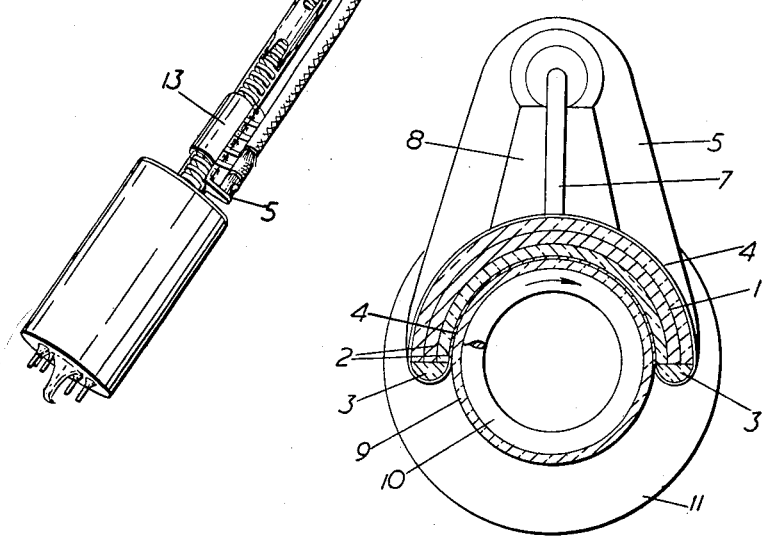
FIG. 2 is a cross-section through the plane 2—2 of FIG. 1 and of a travelling wave tube to which the coupler element of FIG. 1 is filled.

A semi-circular contrawound helix coupler according to the invention overcomes the last mentioned difficulty of the conventional coupler. The coupling element which is applied to the envelope of the travelling wave tube is shown in FIG. 1; FIG. 2 shows a composite cross-section of coupling element and travelling wave tube and FIG. 3 provides a view of a travelling wave tube with helix couplers according to the invention in position at each end. Although, in so far as envelope size is concerned, the invention is particularly useful at high frequencies, the tube illustrated in FIG. 3 was, in fact, designed for a narrow band around 900 mc./s. and to give an output of 100 watts. The coupler element illustrated in FIG. 1 is that designed for this low frequency tube, but the principles involved are applicable for couplers at any frequency.

The coupler element of FIGS. 1 to 4 comprises a curved metal sheet 1 coated with dielectric 2 on both concave and convex sides. Lateral edge pieces 3 of dielectric are provided to complete the circumferential insulation of the metal sheet 1. A continuous helical winding 4 is secured to or formed on the dielectric 2 and over the edge pieces 3. In the experimental devices of FIGS. 1 and 4 the winding consisted of copper tape, but for quantity production one of the known electro-forming techniques may be used.

The metal sheet 1 is secured to a transverse, generally triangular shaped, metal member 5 to which is connected the outer conductor of a coaxial line feeder 6. The helical winding 4 is joined by a tape 7 to the inner conductor of the feeder 6. The tape 7 is spaced from the transverse member 5 by a strip of dielectric 8. For quantity production the tape 7 may be printed onto the strip 8.

The coupler element of FIG. 1 is shaped so as to fit halfway around the travelling wave tube envelope portion enclosing the main helix, as shown in FIGS. 2 and 3. In FIG. 2 the envelope wall is indicated at 9 and a main helix 10 shown as a normal wire for convenience of drawing; in FIG. 3, which is a drawing of the actual tube, it will be seen that the main helix is wound from tape. From FIG. 3 it will also be seen that the envelope portion 11 adjacent the electron collector electrode 12 is of larger diameter than portion 9. To secure the coupler element of FIG. 1 to the travelling wave tube, a curved piece of dielectric 13 is placed around the tube diametrically opposite the coupler element and the two are secured to the tube by circumferential strapping. The arrow in FIG. 2 indicates the direction of winding of the main helix; that half of the helical winding 4 which lies on the concave face of the metal sheet 1 is wound in the opposite direction to the main helix, so that the external part of the winding, on the convex surface, is in the same direction as the main helix.

Figure 4:
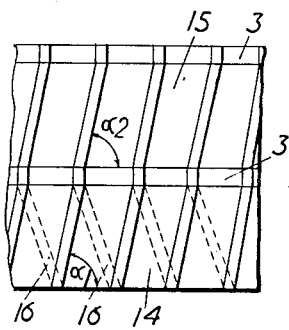
FIG. 4 is a sketch of the "developed" helical winding of the coupler element of FIGS. 1 and 2.

FIG. 4 shows a developed view of part of the helical winding 4—that is, the winding is imagined to be cut along a generator and laid out flat. In the drawing the former to which the winding is secured is also delineated. The concave part of the former and winding corresponds to the portion 14, the convex, or outer, portion corresponds to 15, while the edge pieces 3 correspond to the areas 3 of the drawing. The width of the part 15 is greater than that of 14, for the corresponding cylinders are of different radii, but the difference in width has been somewhat exaggerated to show the difference in pitch between the two halves of each turn of the winding. Over the part 14 the half turns are inclined to the horizontal axis at an angle $\alpha_1$. If the contiguous half turns, instead of being bent around the convex side of the metal sheet 1 of FIGS. 1 and 2, were to have continued uniformly around the travelling wave tube helix, they could have been represented by the dotted lines 16, equally inclined in the opposite direction, and joining opposite ends of the adjacent actual concave half turns. The angle $\alpha_1$ is fixed in the conventional, circular, coupler by the diameter of the glass envelope 9 of FIG. 2 and by the thickness and dielectric constant of the dielectric coating 2 so to provide the outer helical winding with the same axis phase velocity as that of the travelling wave helix. In the present embodiment of our invention, however, it is seen that the angle $\alpha_2$ of the half turns around the convex face of the former must be greater than $\alpha_1$, while the portions of the windings passing over the edge pieces 3 also add to the length of each complete turn. It will be evident, therefore, that, from the point of view of the field theory of the "developed" helical sheet to be found in the literature concerning wave propagation along helices, the propagation constants of the two halves of each turn are different. In accordance with the invention, the mean axial phase velocity, averaged from turn to turn, is made the same as that of the travelling wave tube helix. From the straightforward engineering point of view, it is sufficient, in this type of embodiment of the invention, to ensure that a wave propagated on the helical winding 4 advances at each complete turn along the common axis of the coupling element and travelling wave tube by the same distance as, in the absence of coupling, a wave of the same frequency on the travelling wave tube helix would advance in the same time along the same common axis.

Insofar as concerns the coupling between the main helix and the helical winding 4, it is to be noted that there is tight coupling between the concave, or re-entrant, halves of each turn and the field of the main helix, but that the metal sheet 1 shields the convex half turns of the winding 4 from the main helix; the coupling is thus reduced to zero. It follows that, in this embodiment, there are two transmission lines, the main or travelling wave tube helix, and the helical winding 4, in which the relative phase velocity and coupling coefficients vary rapidly with spatial periodicity, the spatial period being that of a complete turn of the winding 4.

As is to be expected, for complete power transfer from one helix to the other, the length of the coupler in this embodiment is greater than that of the conventional contrawound helix coupler, being approximately twice as great.

The sharp bends in the helical winding 4 as it passes from one side to the other of the metal sheet 1 introduces discontinuities in the performance of the coupler. By suitably shaping the edge pieces 3, which is best done empirically, these discontinuities can be reduced to proportions which have no serious effect on the overall performance. As is indicated in FIG. 2, a satisfactory cross-sectional shape for the edge pieces is an approximate semi-circle having a diameter equal to the total thickness of the metal sheet 1 and the dielectric coatings 2 on both sides; the exact shape for optimum results has been found not to be very critical.

In a first experimental arrangement a main helix of brass tape 0.100 inch wide and 0.010 inch thick was wound at four turns per inch and had a diameter of 1 inch. The semi-circular coupler element was wound with copper tape at 3 turns per inch connected to a 50 ohm coaxial line. The other material dimensions of the coupler were:

Internal diameter of winding _____ inches__ 4–1.3
External diameter of winding _____ do____ 4–1.73
Thickness of metal sheet _____ do____ 1–0.062
Width of winding tape _____ do____ 0.187
Number of turns _____ 9

Standing wave ratio measurements on the experimental coupler showed that for the system of main helix and a coupler according to the invention at each end, over the frequency range 575 mc./s. to 1000 mc./s. the directivity was in excess of 15 db and the coupling loss was less than 2 db.

The travelling wave tube of FIG. 3 had a helix of outer diameter 0.592 inch wound with tape 0.100 inch wide and 0.010 inch thick at a pitch of 0.286 inch. The glass envelope portion supporting the helix was .060 inch thick and had a relative dielectric constant of 5. The semi-circular coupler elements each had an overall length of 2¼ inches and had principal dimensions as follows:

Internal diameter _____ .710 inch.
External diameter _____ .950 inch.
Thickness of metal sheet 1_____ 0.040 inch.
Dielectric coating _____ 0.40 inch polytetrafluorethylene.
Winding pitch _____ 2 turns per inch.
Width of winding tape _____ 0.100 inch.

The couplers fed 50 ohm coaxial line feeders and were found to give a performance similar to the experimental arrangement quoted above.

Figure 5:
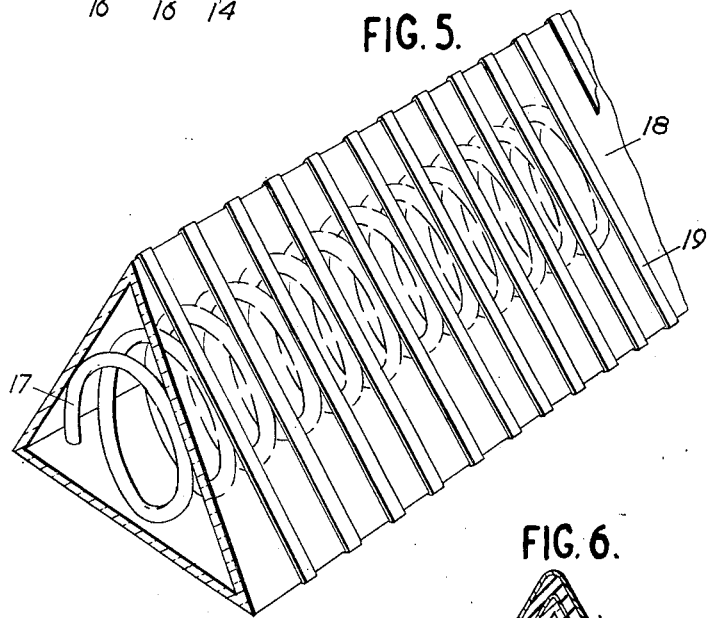
FIG. 5 illustrates diagrammatically another helix coupler embodiment of the invention.
Figure 6:
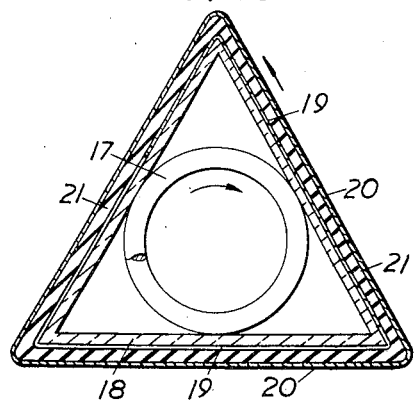
FIG. 6 is a transverse sectional view of the arrangement of FIG. 5.

The contrawound helix coupler just described introduces rapid spatially periodic changes of relative phase velocity and coupling by reason of the re-entrant cross-sectional form of the coupling helix. In FIGS. 5 and 6 periodic changes result from the coupling helix having a different cross-sectional shape to the main helix, but which completely surrounds the main helix.

FIG. 5 shows diagrammatically in perspective a main helix 17 of conventional circular cross-section supported in a glass envelope 18 which is of triangular cross-section so as to reduce, as far as possible, the effect of the surrounding dielectric on the propagation characteristics of the helix 17. A contrawound coupling helix 19 is wound closely about the envelope 18 so that its turns lie along each side. To simplify the drawing no impedance reducing conducting sheet is shown around the coupling helix 19; though usually convenient from the practical point of view of coupling to a low impedance coaxial line, such a sheet is not essential to the invention; a closely spaced conducting sheet 20, spaced from the winding 19 by dielectric 21, is however shown in the cross-section of FIG. 6 in which the arrows indicate the directions of winding of the two helices.

With the arrangements of FIGS. 5 and 6 it is possible to analyse the propagation constants of the two helices on the basis of a simplified transmission line theory. The relative phase velocity of the two helices must then be considered to vary rapidly with common axial distance with respect to one another, and this variation repeats itself with a period equal to the distance between consecutive turns of the outer helix. Without going into this theoretical analysis and a consideration of the respective propagation constants of the helices, it is evident that the coupling between them varies along each turn of the outer helix being a maximum at the centroids of the sides of the envelope and a minimum at the apices. In accordance with the invention to obtain a complete power interchange between the helices it is merely necessary to ensure that the time taken for a wave to propagate around one turn of the outer helix is the same as the time taken by a wave of the same frequency to propagate along the inner helix over an equivalent axial length.

Practical versions of the embodiments of FIGS. 5 and 6 have been subject to analytical investigation which has been confirmed experimentally. Thus the simplified transmission line analysis predicted in one case a length 2.5 times that of the conventional circular sectioned close coupled contrawound helix coupler to obtain complete power transfer, while, experimentally, the required length was found to be 2.1 times that of the conventional coupler. In other respects the performance of the triangular sectioned coupler was similar to that of the conventional one. The latter, of course, could not be used over a triangular envelope as the coupling would be too weak.

Figure 7:
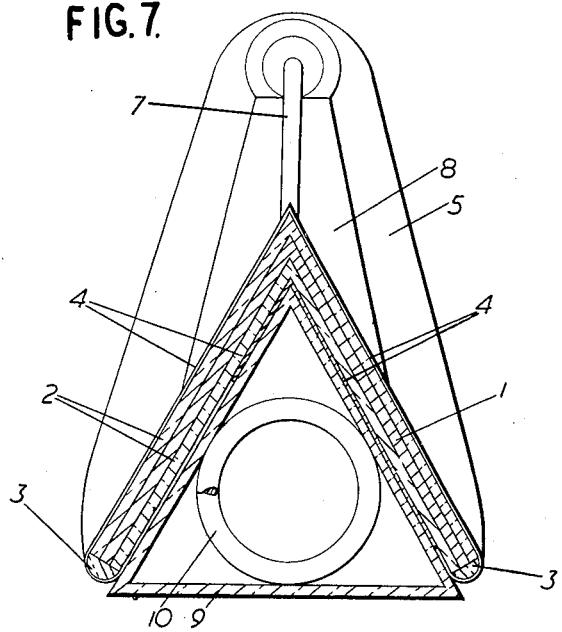
FIG. 7 shows a transverse sectional view of a triangular coupler element similar in essentials to the coupler element of FIGS. 1 and 2.

If desired the semi-circular coupler of FIGS. 1 to 4 could be modified for use with a main helix supported in a polygonal envelope. For the triangular case the external coupler element would conveniently encompass two sides of the triangle, the resultant cross-sectional configuration then being as shown in FIG. 7, in which parts having the same function as in FIG. 2 have been given the corresponding same reference numerals. The length of the coupler would be somewhat greater than in the semi-circular case; for an arrangement which, with a totally encompassing coupling helix requires a coupling length, as quoted above, of 2.1 times the conventional closely coupled circular coupler, the equivalent arrangement of FIG. 7 would require a length approximately 3 times as great.

Figure 8:
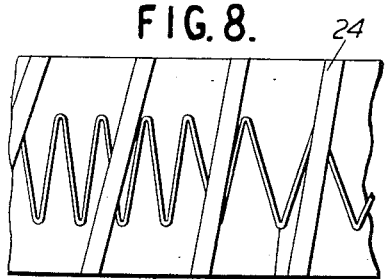
FIG. 8 illustrates the application of the invention to a tapered helix coupler.

In the embodiments so far described with reference to the drawings, the main helix has been of the conventional circular cross-section and variety. The principles of the invention would apply equally well to a case where the main helix was also non-uniform. Furthermore, the invention can be applied to the case of the tapered helix coupler. This is illustrated in FIG. 8, which represents part of a side view of a main helix 22 of circular cross-section, but tapered pitch supported in a triangular glass envelope 23. The coupling helix 24 is contrawound and tapered in the opposite sense to the main helix. Thus going from left to right, on the drawing, the main helix turns become further apart from one another so that the axial phase velocity of a wave propagated from left to right along helix 22 is continuously increasing. In the coupling helix 24 the turns from left to right become closer together so that the axial phase velocity is continuously decreasing; in addition the relative phase velocity is subject to rapid spatially periodic variation as explained with reference to FIG. 5. To provide complete power interchange between the two helices the relative phase velocities on the two helices, averaged over a complete period of the rapid spatial variation, must be the same at some intermediate region of the length of the coupler, while the rate of change of the mean relative phase velocity must be comparatively slow, as discussed in the paper by Cook previously mentioned.

Figure 10:
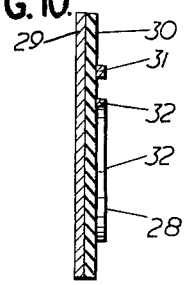
FIG. 10 shows a cross section through the planes 10—10 of FIG. 9.
Figure 9:
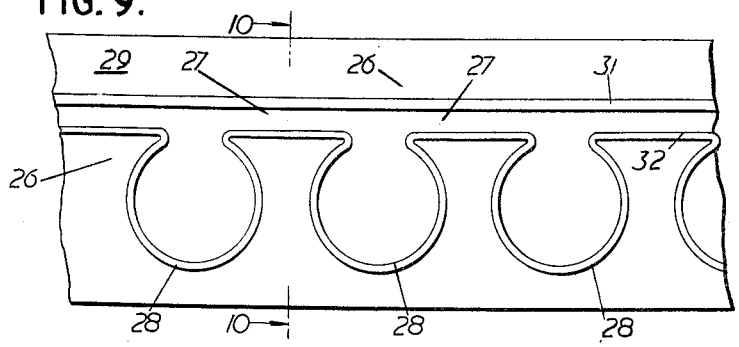
FIG. 9 shows, diagrammatically, a section through a strip line narrow band directional coupler according to the invention.

In the general discussion with reference to coupled transmission lines, the basic principle underlying the present invention was explained with reference to observations of the phase difference between waves on the two transmission lines at spaced apart observation points. It is clear that the same observation results whether one wave in fact, keeps in step with the other wave or from one observation point to the other or changes its phase by any multiple of 360°. An application of this principle to a narrow band separating filter is illustrated in FIGS. 9 and 10.

Here a main transmission line 25 of microstrip construction is assumed to be propagating a wide band of frequencies and it is desired to subtract a narrow band of signals from the wide band. For this purpose a similar line 26 is taken parallel to 25 and in coupling relation thereto in a multiplicity of equal lengths 27; in between the lengths 27, the line 26 is taken in loops 28, each an integral number of wavelengths long of the mid-band frequency of the waves it is desired to take off from the line 25, so that along each coupled length 27 waves of the mid-band frequency keep in step with one another, but the phase of one wave has changed by an integral number of oscillation periods with respect to the other at similarly positioned reference points in consecutive lengths 27. The necessary conditions for power transfer according to the invention are thus satisfied at this mid-band frequency, but since the lengths of loops 28 will not contain an integral number of wavelengths of frequencies outside a narrow band centred on the mid-band frequency, the conditions for power interchange between the two lines are not satisfied outside the narrow band. Thus only the said mid-band frequency and closely adjacent frequencies will be transferred from line 25 to line 26.

The line 25 comprises a "ground plane" conductor 29 coated with dielectric 30 on which is printed or otherwise formed a relatively much narrower "above ground" conductor 31. The line 26 is similarly constructed by a second "above ground" conductor 32 sharing the same ground plane conductor 29. In this type of transmission line the electric fields are largely concentrated between the above ground conductor and the ground plane; nevertheless if the above ground conductors of two lines are closely spaced parallel to one another, as represented in FIG. 9, then there will be coupling between the lines. In the loops 28 the lines are effectively uncoupled.

The principle of the narrow band filter aspect of the present invention can also be applied, if desired, to the contrawound helix couplers previously described. With a uniform main helix the time for propagation along the coupling helix, from turn to turn, would then differ by a complete number of periods of the mid-band oscillation frequency from the time taken for a wave to progress along an equivalent length of the main helix.

Finally, although in the embodiments described it has been assumed that complete transfer of power from one transmission line to the other is required, if desired the length of the coupler can be adjusted so as to abstract from the driving line, only part of the power in the frequency band concerned.

While the principles on the invention have been described above in connection with specific apparatus, it is to be clearly understood that this description is made only by way of example and not as a limitation on the scope of the invention.

What is claimed is:

1. A pair of physically spaced waveguides of different form each constructed to provide substantially the same mean value of propagation constant for waves of the same frequency over a given length, said waveguides being positioned in coupling relation to one another to provide substantially irreversible power interchange at successive intervals over said given length, one of said waveguides surrounding a semi-circular surface of the other waveguide at its extremities and insulated therefrom, said waveguides providing a relative phase velocity for waves of said frequency varying in like manner in each said successive length.

2. A waveguide directional coupler comprising a contra-wound pair of helices of respectively different cross-sectional configuration coupled together along a given length, one of said waveguides surrounding a semi-circular surface of the other waveguide at its extremities and insulated therefrom, the propagation characteristics of the helices being such that for two waves of the same frequency propagated one along each of the helices, the time taken by each wave to traverse the said length is either substantially the same or differs by a complete number of periods of the oscillations of said frequency.

3. A contra-wound helix coupler according to claim 2 further comprising a conducting surface closely and uniformly spaced from each turn of, and, lying within, one of the said helices, and in which this helix has a re-entrant portion of its cross-section which partially surrounds the other said helix, the arrangement being such that the re-entrant part only of each turn of the one helix is coupled to the other helix, the remaining part of the turn being shielded from the field of the other helix by the said conducting surface.

4. A contrawound helix coupler element of generally semi-circular cross-sectional configuration for use as means for coupling a coaxial transmission line feeder to the helix of a traveling wave tube comprising a dielectric-coated metal sheet shaped to fit substantially halfway around a length of the envelope portion of the travelling wave tube about the helix, a ribbon of conducting material applied to or formed on the dielectric coating of the metal sheet as a continuous helical winding around it so as to form on the concave side of the metal sheet substantially half turns of a helix of oppositely directed pitch to the travelling wave tube helix, and so dimensioned that substantially complete power interchange between the element and the said helix.

5. A contrawound helix coupler element according to claim 4 in which the said metal sheet is joined at one end to a transverse conducting member and the adjacent end of the helical winding is connected to a radially extending conductor spaced from the said transverse member with which it forms a length of microstrip transmission line.

6. A coupler element according to claim 5 comprising a length of coaxial transmission line having its outer conductor connected to the said transverse member and its inner conductor connected to the said radially extending conductor.

7. A coupler element according to claim 4 in which the said helical winding is spaced from the longitudinal edges of the said metal sheet by insulating material shaped to reduce the impedance discontinuities at the transition regions joining the convex to the concave sides of the element.

8. The modification of a contrawound helix coupler element according to claim 4 in which the cross-sectional configuration of the element embraces two sides of a triangle, the element being adapted for use with a travelling wave tube having a triangular envelope portion supporting the helix.

9. The modification of a waveguide directional coupler according to claim 2 comprising a tapered contrawound helix coupler in which the time taken by one of said waves to traverse consecutive turns of one helix increases monotonically, the time taken by the other wave to traverse consecutive turns of the other helix decreases monotonically and the phase velocities of the waves become equal in a region intermediate the ends of the coupler.

References Cited in the file of this patent
UNITED STATES PATENTS

| | | |
|---|---|---|
| 2,871,452 | Hewlett | Jan. 27, 1959 |
| 2,905,858 | Cutler | Sept. 22, 1959 |
| 2,942,212 | Mynall | June 21, 1960 |